United States Patent [19]

Hayashi et al.

[11] Patent Number: 5,754,316
[45] Date of Patent: May 19, 1998

[54] COLOR CORRECTION DEVICE FOR CORRECTING COLOR DEVIATIONS RESULTING FROM COLOR FILTER CHARACTERISTICS

[75] Inventors: Shuji Hayashi; Haruo Yamamoto; Shinji Hayashi, all of Osaka, Japan

[73] Assignee: Mita Industrial Co., Ltd., Osaka-fu, Japan

[21] Appl. No.: 673,670

[22] Filed: Jun. 26, 1996

[30] Foreign Application Priority Data

Jun. 29, 1995 [JP] Japan .................. 7-163740

[51] Int. Cl.$^6$ ............. H04N 1/46; G03F 3/08
[52] U.S. Cl. ............. 358/518; 358/515; 358/520; 358/523; 358/512; 382/167
[58] Field of Search ................ 358/518, 515, 358/520, 523, 512; 382/167; 395/109

[56] References Cited

U.S. PATENT DOCUMENTS

| | | | |
|---|---|---|---|
| 4,989,079 | 1/1991 | Ito | 358/520 |
| 5,331,441 | 7/1994 | Akuzawa et al. | 358/530 |
| 5,442,717 | 8/1995 | Murakami | 382/162 |
| 5,497,431 | 3/1996 | Nakamura | 382/162 |
| 5,541,742 | 7/1996 | Imao et al. | 358/518 |
| 5,568,284 | 10/1996 | Oku et al. | 358/518 |
| 5,568,285 | 10/1996 | Ikeda | 358/518 |

FOREIGN PATENT DOCUMENTS

| | | | |
|---|---|---|---|
| 3636658 | 4/1987 | Germany | H04N 1/46 |
| 4113557 | 11/1991 | Germany . | |

*Primary Examiner*—Edward L. Coles, Sr.
*Assistant Examiner*—Tia M. Harris
*Attorney, Agent, or Firm*—Jordan and Hamburg

[57] ABSTRACT

A color correction device for applying a correction to an image read from an original image so as to correct color deviations caused by spectral characteristics of a color image reader, including:

a data conversion device for converting the image of the color components into image data of color components based on three attributes, a color deviation detection device for detecting a color deviation of a reference color by comparing with a predetermined hue data of the reference color, a storage device for storing correction coefficients set in advance for the respective colors, a correction data setting device for setting correction data used to correct the color deviations of the respective colors, and a data correction device for correcting the hue data of the respective colors by the correction data setting device.

8 Claims, 8 Drawing Sheets

1

COLOR CORRECTION DEVICE FOR CORRECTING COLOR DEVIATIONS RESULTING FROM COLOR FILTER CHARACTERISTICS

BACKGROUND OF THE INVENTION

The present invention relates to a color correction device for applying a color correction to a color image read by an image reading apparatus such as a color scanner and, particularly to a color correction device for correcting a color deviation caused by spectral characteristics of color filters of the image reading apparatus.

There is known a color copier for reading an original image by a color scanner including a color CCD (charge coupled device) and forming a color image on a copy sheet based on the read image data.

In such a color copier, the read image is output as image data of three primary colors of R (red), G (green) and B (blue) from the color scanner. The image data of three primary colors are converted into image data of their complementary colors of C (cyan), M (magenta) and Y (yellow), and are then subjected to color corrections defined by masking equations shown in equations (1):

$$D_c = A_{11} \cdot D_c + A_{12} \cdot D_M + A_{13} \cdot D_Y$$
$$D_M = A_{21} \cdot D_c + A_{22} \cdot D_M + A_{23} \cdot D_Y$$
$$D_Y = A_{31} \cdot D_c + A_{32} \cdot D_M + A_{33} \cdot D_Y \quad (1).$$

The above color corrections are performed to improve the color reproducibility of the color image formed on the copy sheet by correcting lacking and/or unnecessary color components according to actual spectral characteristics of toners since toners of C, M, Y do not have ideal spectral characteristics.

The color correction in accordance with the masking equations (1) is briefly described taking a color of magenta as an example.

FIG. 9 is a graph showing an example of the spectral characteristic of the magenta toner. In the case that the magenta toner has an ideal spectral characteristic, all rays in a blue wavelength region $\lambda$ B and a red wavelength region $\lambda$ R are reflected, and rays in a green wavelength region $\lambda$ G are completely absorbed as shown in dotted lines in FIG. 9. However, the spectral characteristic of the actually used magenta toner show that: the rays in the blue wavelength region $\lambda$ B and the red wavelength region $\lambda$ R are partially absorbed and the rays in the green wavelength region $\lambda$ G are partially reflected.

Accordingly, even if the input image data is pure magenta, the color of magenta image formed on the copy sheet may lack components in the blue wavelength region $\lambda$ B and the red wavelength region $\lambda$ R (components in a region A1 of FIG. 9) and may have redundant components in the green wavelength region $\lambda$ G (components in a region A2 of FIG. 9). Thus, pure magenta cannot be reproduced.

In view of this, the input image data of C-, M-, Y-components are corrected so that the color of the magenta image formed on the copy sheet maximally contains color components of pure magenta. This correction is applied to compensate for the lacking components in the blue wavelength region $\lambda$ B and the red wavelength region $\lambda$ R and to reduce the redundant components in the green wavelength region $\lambda$ G by mixing the image data of C-, M-, Y-components at a specified ratio. Mathematically, this correction is generally expressed by the above masking equations.

It should be appreciated that the correction coefficients $A_{ij}$ (i=1, 2, 3, j=1, 2, 3) of the masking equations are theoretically or empirically set according to the spectral characteristics of the toners and of the color filters of the color scanner.

The known color correction in accordance with the masking equations is applied to correct the color deviations caused by the spectral characteristics of the actually used toners and output gradation characteristics, but not to correct the color deviations caused by the spectral characteristics of the color filters of the color scanner. Thus, in the case that the color deviation occurs while the image data is read by the color scanner, the color correction in accordance with the masking equations is applied based on the image data of C-, M-, Y-components having experienced the color deviations. Therefore, the colors of the color image formed on the copy sheet are different from the colors of the original image.

Particularly in the case that the spectral characteristics of the color scanner cause the overall color deviations, the colors of the color image recorded on the copy sheet may be completely different from the colors of the original image, thereby giving a sense of incongruity.

It is an object of the invention to provide a color correction device capable of correcting color deviations of an image read by an image reading apparatus and improving a color reproducibility of an output image.

SUMMARY OF THE INVENTION

The invention is directed to a color correction device for applying a correction to an image read from an original image by color image reader means while being separated into color components of three primary colors so as to correct color deviations caused by spectral characteristics of the color image reader means, comprising:

data conversion means for converting the image of the color components of the three primary colors output from the color image reader means into image data of color components based on three attributes, color deviation detection means for detecting a color deviation of a reference color by comparing a hue data obtained by converting the image data of the reference color read by the color image reader means by the data conversion means with a predetermined hue data of the reference color, storage means for storing correction coefficients set in advance for the respective colors, correction data setting means for setting correction data used to correct the color deviations of the respective colors by multiplying the detected color deviation of the reference color by the correction coefficients, and data correction means for correcting the hue data of the respective colors obtained by converting the image data of the original image read by the color image reader means by the data conversion means using the correction data set by the correction data setting means.

With this construction, the color deviations of the image data read by the color image reader means which are caused by the spectral characteristics of the color image reader means are properly corrected on the basis of the color deviation of the reference color using the set correction data.

Accordingly, the color deviations caused by the spectral characteristics of the image reader means (such as a color filter of the scanner) are reduced, thereby improving the color reproducibility of the color image formed on the copy sheet.

Furthermore, since the correction data are set by multiplying the color deviation of the reference color by the predetermined correction coefficients of the respective colors, even upon a change of the spectral characteristics of the color image reader, the color deviations caused by the spectral characteristics after the change can be easily corrected.

In accordance with another preferred embodiment of this invention, a color correction device for applying a correction to an image read from an original image by color image reader means while being separated into color components of three primary colors so as to correct color deviations caused by spectral characteristics of the color image reader means, comprising:

storage means for storing correction data used to correct the color deviations caused by the spectral characteristics of the color image reader means for a plurality of predetermined hues, data conversion means for converting the image data of the color components of the three primary colors output from the color image reader means into image data of color components based on three attributes, and data correction means for correcting hue data of the respective colors obtained by converting the image data of the original image read by the color image reader means by the data conversion means using the correction data for the hues stored in the storage means.

With this construction, since the correction data for the color deviations are obtained in advance, an operation of setting the correction data for the respective hues based on the color deviation of the reference color can be obviated.

It would be appreciate that the color components of the three primary colors are R (red), G (green) and B (blue).

The color components of the three primary colors are alternatively C (cyan), M (magenta) and Y (yellow).

It should be further note that the color components based on the three attributes are color components of a HLS (or Hue-Lightness-Saturation) color specification system.

These and other objects, features and advantages of the present invention will become more apparent upon a reading of the following detailed description and accompanying drawings.

DETAILED DESCRIPTION OF THE INVENTION

Figure 1:
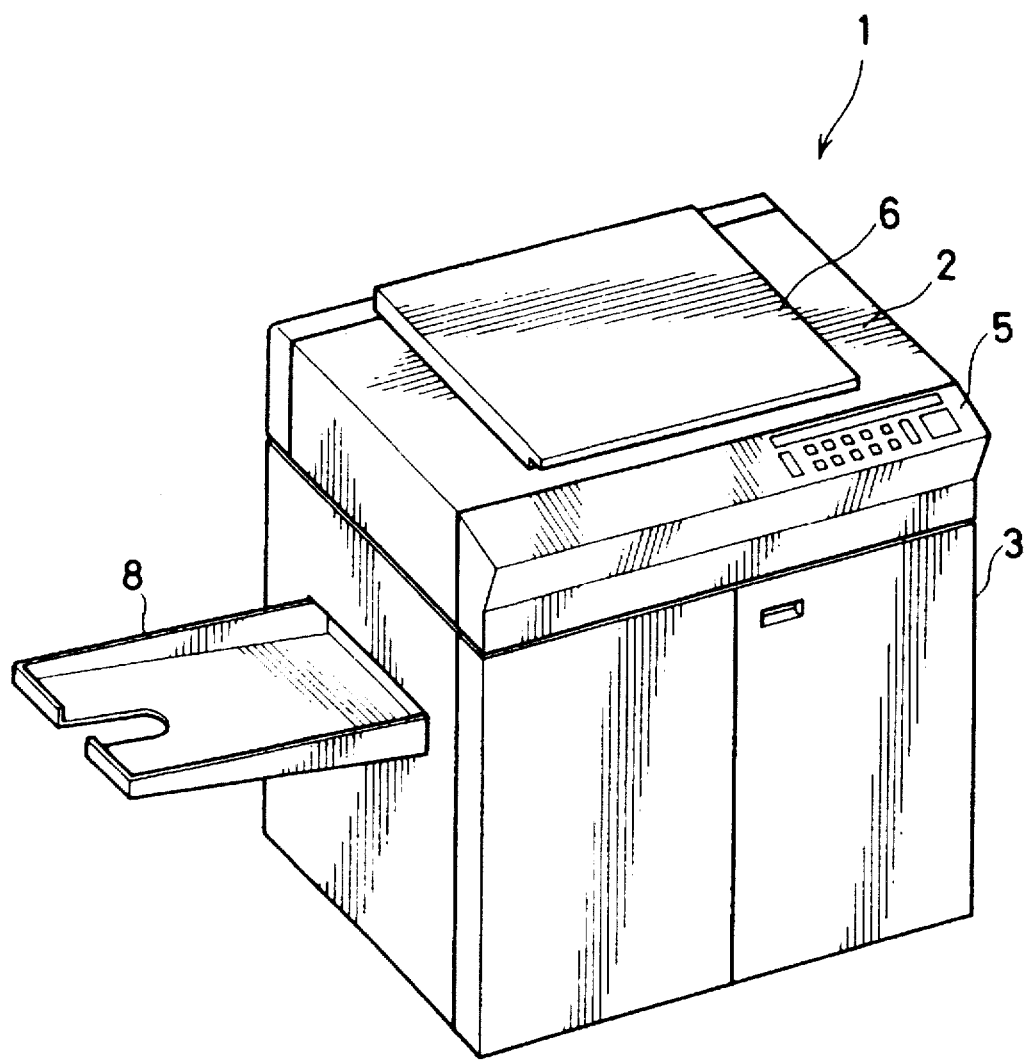
FIG. 1 is a perspective view of a color copier provided with a color correction device according to the invention.
Figure 2:
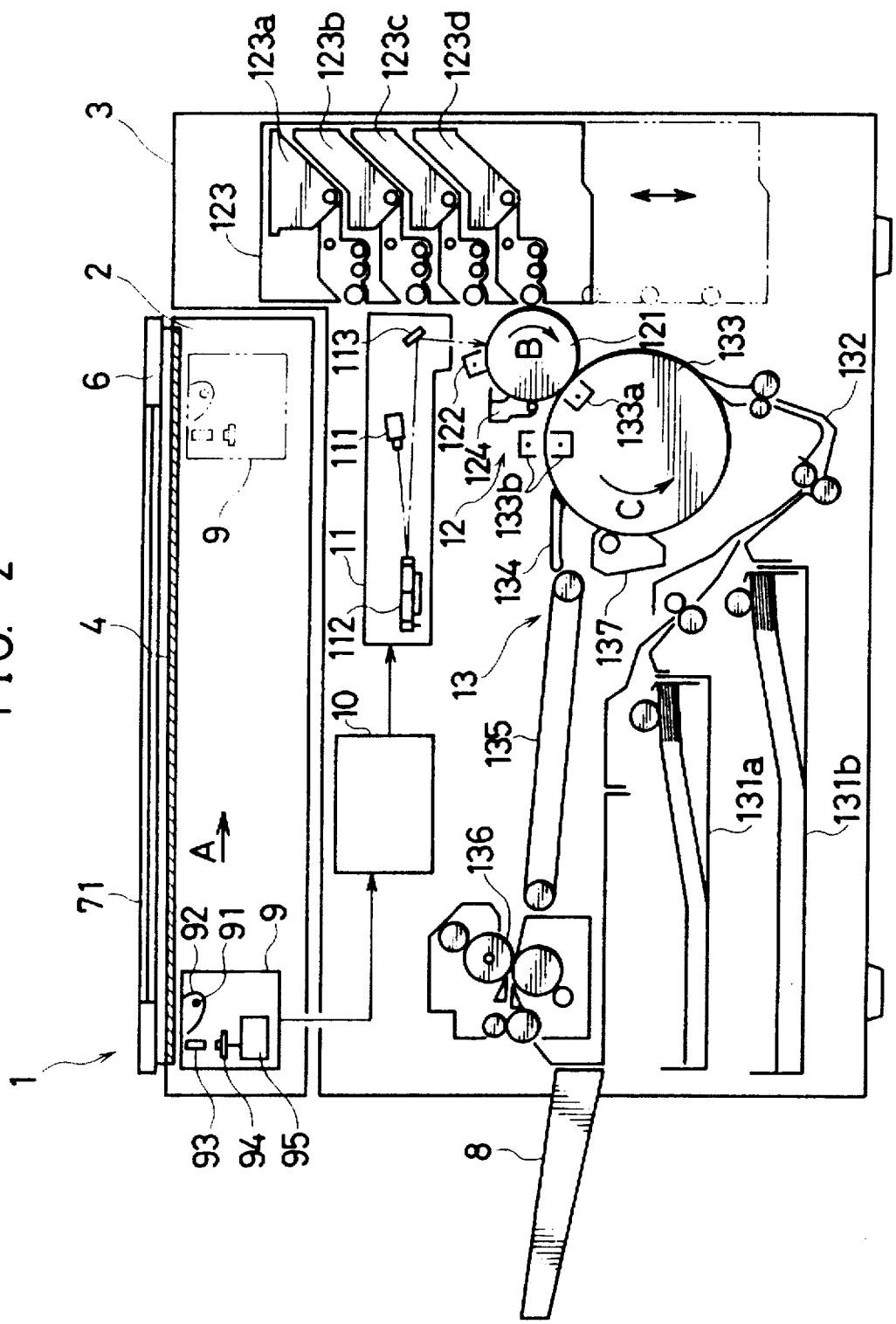
FIG. 2 is a diagram showing the interior construction of the color copier.

FIG. 1 is a perspective view of a color copier provided with a color correction device according to the invention, and FIG. 2 is a diagram showing the interior construction of the color copier.

A color copier 1 includes a scanner 2 for reading a color original image and a printer 3 for forming a color image on a copy sheet based on the image data read by the scanner 2.

The scanner 2 is arranged at the top of a main body of the color copier 1, and the printer 3 is arranged below the scanner 2. On the upper surface of the scanner 2, there are provided a platen glass 4 on which an original is set and an operation panel 5. An original holder 6 is openably and closably provided on the top of the platen glass 4. Operation switches 5 used in connection with a copying operation including a copy key, ten number entry keys, a clear key and a density adjustment key are provided in the operation panel 5.

Below the platen glass 4, an image reader 9 is provided, capable of reciprocating along a direction A (see FIG. 2) between a home position to a rear end position of a maximum original size. The image reader 9 includes an illumination lamp 91 for illuminating the original placed on the platen glass 4, a reflector 92, a self focusing lens (or SELFOC lens) 93 for focusing the light reflected by the original on an image pickup device 94, the image pickup device 94 including a CCD color line sensor and the like for reading the focused original image, and a converter circuit 95 for converting the image data of R-, G-, B-components read by the image pickup device (hereinafter, "CCD 94") into image data of C-, M-, Y-components.

The CCD 94 includes color filters of R, G, B for the respective pixels, separates the image at the same pixel position into image signals (analog signals) of R-, G- and B-components and outputs the same. The converter circuit 95 converts the analog image signals of R, G, B into digital signals, converts these digital signals into image data of C, M, Y which are primary colors of a subtractive color process, and outputs the same.

The image data of R-, G-, B-components are converted into image data of C-, M-, Y-components.

$$C=(1-Ri/RO)$$
$$M=(1-Gi/GO)$$
$$Y=(1-Bi/BO) \qquad (2)$$

where C, M, Y: normalized density (gradation) levels of the three primary colors of the subtractive color process Ri, Gi, Bi: read density (gradation) levels of the three primary colors of the additive color process RO, GO, BO: maximum density (gradation) levels after the A/D conversion.

For example, in the case that the image data includes a 8-bit data, an image density is expressed in resolving power of 256 gradations. Since the maximum density levels RO, GO, BO are 255, the image data of C-, M-, Y-components are $C=(1-Ri/255)$, $M=(1-Gi/255)$, $Y=(1-Bi/255)$, respectively.

The image reader 9 reads the original image line by line while moving from the home position to the rear end position of the original size. The image signals obtained by the image reader 9 are converted into the image data of C-, M-, Y-components as described above, and are sent to an image processing unit 10 provided in the printer 3.

The printer 3 includes the image processing unit 10, an exposing device 11 for exposing a photosensitive drum 121 to form a latent image of the original image, an imaging assembly 12 for forming a color image of the original image on a copy sheet, and a sheet transport assembly 13 for feeding the copy sheet to the imaging assembly 12 and discharging the copy sheet bearing the formed color image, and a discharge tray 9 for receiving the discharged copy sheet.

The exposing device 11 includes a laser emitter 111 for emitting a laser beam modulated by the image data, a polygonal mirror 112 for causing the laser beam to scan the surface of the photosensitive drum 121 in an axial direction, and a mirror 113 for introducing the laser beam to the photosensitive drum 121.

The imaging assembly 12 includes the photosensitive drum 121 for forming a latent image of the original image and a color developed image, a charging device 122 for charging the photosensitive drum 121, a developing unit 123 for developing the latent image formed on the photosensitive drum 121, and a cleaning device 124 for removing unnecessary toner remaining on the photosensitive drum 121. The charging device 122, the developing unit 123 and the cleaning device 124 are arranged around the photosensitive drum 121. Downstream from the developing unit 123 is arranged a transfer drum 133 which is brought into contact with the surface of the photosensitive drum 121 to feed the copy sheet.

The photosensitive drum 121 is driven to rotate in a direction of arrow B at a specified speed when the latent image and/or the developed image are formed on the surface thereof. On the other hand, the transfer drum 133 is driven to rotate in a direction of arrow C in synchronism with the rotation of the photosensitive drum 121. At this time, the rotation control is such that the peripheral speed of the transfer drum 133 and that of the photosensitive drum 121 are same.

The developing unit 123 includes four developing devices 123a to 123d arranged in a number of stages along the vertical direction and movable upward and downward as a single unit. Cyan, magenta, yellow and black toners are contained in the respective developing devices 123a to 123d in this order from the top. Each of the developing devices 123a to 123d can be brought into contact with the surface of the photosensitive drum 121 in a specified developing position defined in the vertical direction. The latent image formed on the photosensitive drum 121 is developed by successively moving the respective developing devices 123a to 123d upward or downward to the developing position and by forming the toner images in the order of cyan, magenta, yellow and black.

The sheet transport assembly 13 includes sheet cassettes 131a, 131b for containing copy sheets which are disposed in a lower part of the printer 3, a guide mechanism 132 for guiding the copy sheet fed from the cassette 131a or 131b to the transfer drum 133, a separation claw 134 for separating the copy sheet electrostatically attracted to the surface of the transfer drum 133, a transport mechanism 135 for transporting the separated copy sheet to a fixing device 136, and the fixing device 136 for fixing the formed toner image to the copy sheet.

A transfer device 133a for transferring the toner image formed on the photosensitive drum 121 to the copy sheet by corona discharge is built in the transfer drum 133. Further, a pair of separation chargers 133b for separating the copy sheet from the transfer drum 133 by corona discharge are opposed to each other inside and outside the transfer drum 133 downstream from the transfer device 133a along the rotating direction of the transfer drum 133. The separation claw 134 is disposed downstream from the separation chargers 133b.

A cleaning device 137 for cleaning the surface of the transfer drum 133 after the copy sheet is separated is disposed around the transfer drum 133 and downstream from the separation claw 134.

In the above construction, the image data of R-, G-, B-components read by the scanner 2 are output to the image processing unit 10 after being converted into the image data of C-, M-, Y-components. A specified image signal processing is applied to the converted image data in the image processing unit 10. During the image signal processing, an image data of BK (black) is generated, and the image data of C, M, Y and BK are successively output from the image processing unit 10 to the printer 3, and a color image is formed on the copy sheet based on the image data of the respective colors.

The color image is formed by transferring four toner images of C, M, Y and BK to the copy sheet, i.e. by performing the image transfer four times. Specifically, the laser beam modulated by the image data of C-components is first emitted from the exposing device 11 onto the photosensitive drum 121 charged at a specified potential by the charging device 122 to form a latent image of C-components of the original image. The laser beam is emitted while scanning the surface of the photosensitive drum 121 in a raster direction in synchronism with the peripheral speed of the photosensitive drum 121, thereby forming the latent image.

The latent image formed on the photosensitive drum 121 is rotated to the developing position, where cyan toner is electrostatically attracted to the latent image by the developing device 123a of the developing unit 123 to develop the same. The thus developed toner image is rotated to an imaging position, where it is pressed against the fed copy sheet and the image of C-components of the original image is transferred and formed on the copy sheet.

After having its surface cleaned by the cleaning device 124, the photosensitive drum 121 after the image formation is charged again at the specified potential by the charging device 122, and the latent image of M-components of the original image is developed with magenta toner in a manner similar to the above. This magenta toner image is transferred and formed on the copy sheet fed again to the transfer position by the transfer drum 133 without being separated.

After toner images of Y- and BK-components of the original image are transferred and formed in succession on the copy sheet in similar manners, the formation of the color image is completed. The copy sheet attracted to the transfer drum 133 is separated therefrom by the separation claw 134, transported to the fixing device 136 by the transport mechanism 135, and discharged onto the discharge tray 8 after having the transferred toner images fixed thereto.

Figure 3:
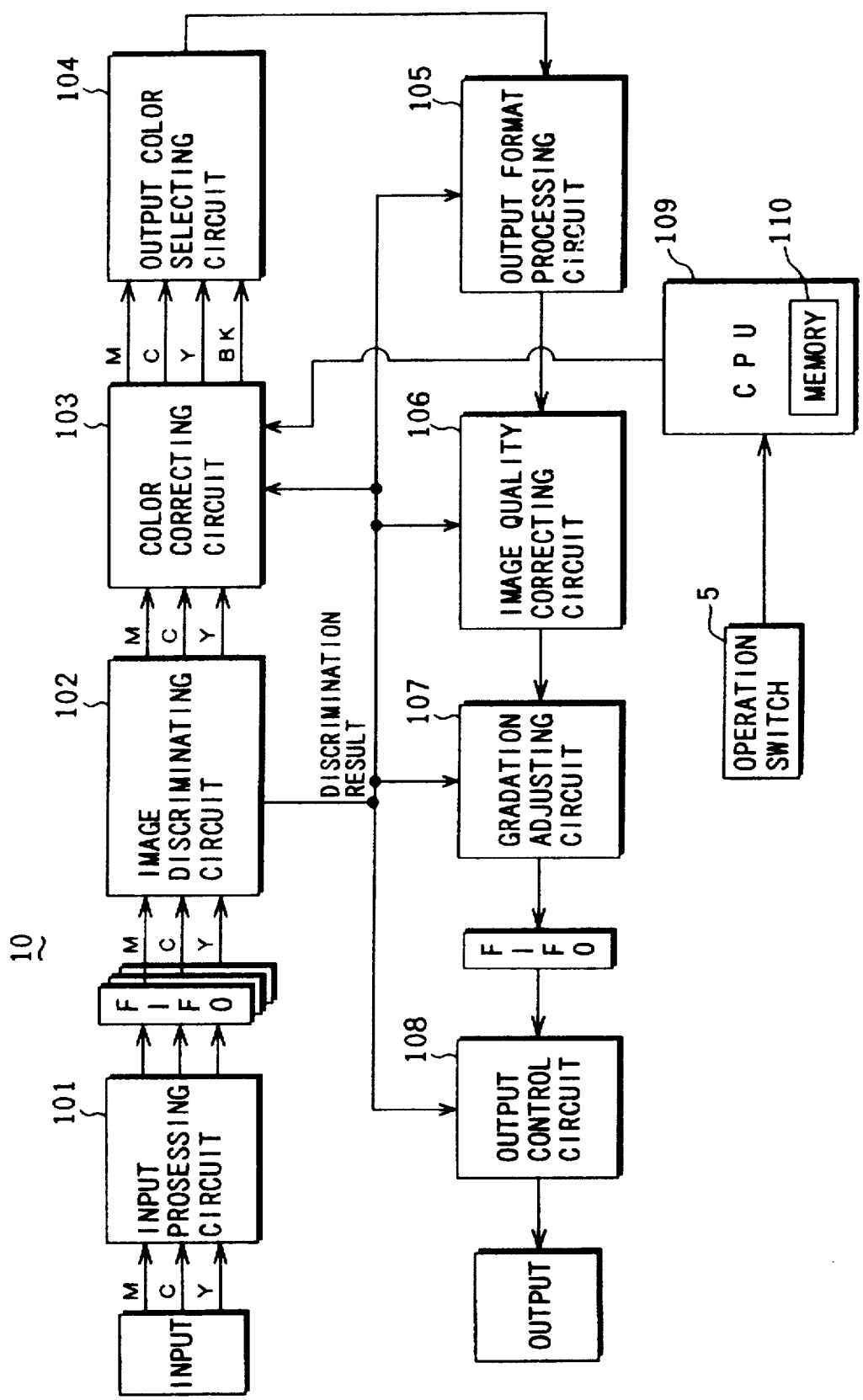
FIG. 3 is a basic block construction diagram of an image processing unit.

FIG. 3 is a basic block construction diagram of the image processing unit 10.

The image processing unit 10 includes an input processing circuit 101, an image discriminating circuit 102, a color correcting circuit 103, an output color selecting circuit 104, an output format processing circuit 105, an image quality correcting circuit 106, a gradation adjusting circuit 107, an output control circuit 108 and a control circuit 109 (identified by CPU in FIG. 3). The image data of C-, M-, Y-components at the respective pixel positions are input to the image processing unit 10 in a parallel manner, and the image processing is performed in a parallel manner until a color correction to be described later is completed.

The input processing circuit 101 is adapted to adjust the imaging position in the copy sheet and discriminate whether the image to be formed is a color image or a monochromatic image. The input processing circuit 101 cuts off the image data at the edges of the original to prevent an image from being formed on the edges of the copy sheet, and adjusts the imaging position of the input image in the copy sheet. The input processing circuit 101 also discriminates whether the input image is a color image or a monochromatic image based on the signal levels of the image data of C-, M-, Y-components.

The image discriminating circuit 102 is adapted to discriminate a character image area, a pictorial image area, and a dot image area of the input image. This circuit 102 makes the above discrimination based on the signal levels and the array of the respective image data forming the image.

The color correcting circuit 103 applies a color correction to the image data of C-, M-, Y-components in view of the spectral characteristics of the color filters of the CCD 94 and those of the color toners of C, M, Y, extracts black pixel positions from the image data of C-, M-, Y-components and generates the image data of BK in those pixel positions. This circuit 103 acts as data conversion means and data correction means according to the invention.

The output color selecting circuit 104 is adapted to serially output the image data of the respective colors of C, M, Y, BK input in a parallel manner from the color correcting circuit 103 in the order of C, M, Y, BK.

The output format processing circuit 105 is adapted to process the image data of C-, M-, Y-, BK-components in accordance with an output format such as a mirror image, a zooming, or a movement which is set using the operation switches 5.

The image quality correcting circuit 106 is adapted to correct the quality of the image formed on the copy sheet. For example, in the case that the outline of the input image is unclear due to a resolving power of the scanner 2, an outline correction is performed to make the image more clear. Further, in the case that the input image seems to be hard, the correction is performed to soften the output image.

The gradation adjusting circuit 107 is adapted to correct the gradations of the image data of C-, M-, Y-, BK-components. The output control circuit 108 is adapted to generate an emission control signal to be output to the laser emitter 111. This circuit 108 generates a control signal obtained by PWM-modulating a reference clock by the image data, and outputs this control signal to the exposing device 11.

The control circuit 109 includes a microcomputer and centrally controls the operation of the circuits 101 to 108. This circuit 109 constitutes color deviation detection means and correction data setting means according to the invention, and sets a correction data used to correct an overall color deviation caused by the spectral characteristics of the color filters of the scanner 2. The control circuit 109 includes a memory (storage means) 110 having a ROM (read only memory) or the like for storing correction coefficients to set the correction data in correspondence with the respective colors.

Here, the overall color deviation caused by the spectral characteristics of the color filters of the scanner 2 and the correction data are briefly described.

Figure 4:
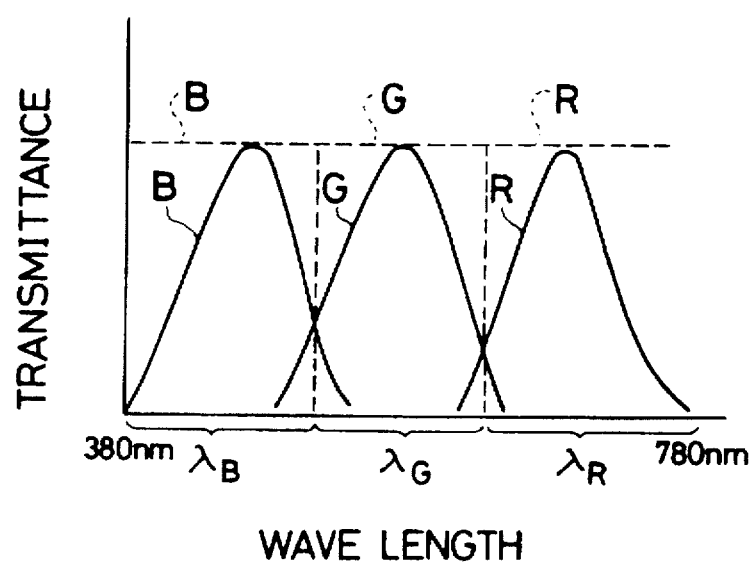
FIG. 4 is a graph showing exemplary spectral characteristics of color filters of R, G, B adopted by a color scanner.

FIG. 4 is a graph showing exemplary spectral characteristics of the respective color filters of R, G, B used in the color scanner. As shown in FIG. 4, the spectral characteristic of each color filter has a wider transmission range than the ideal spectral characteristic (characteristic indicated by dotted line in FIG. 4), and a bottom part thereof spreads into neighboring regions. Thus, the image data read by the color scanner has, strictly speaking, spectral characteristics different from those of colors of the original image.

For example, when a pure red original image is read by the color scanner, if the color filters are ideal, only R-components are output from the color scanner and B- and G-components are not output. However, in reality, the rays in the red region $\lambda_R$ pass through the B- and G-filters and, therefore, the B- and G-components are also output.

Thus, if the image data of R-, G-, B-components output from the color scanner are converted into the image data of C-, M-, Y-components, unnecessary C-components are generated in addition to the M- and Y-components. This is considered to be equivalent to reading of a color deviated from pure red by a color scanner having ideal color filters.

Figure 5:
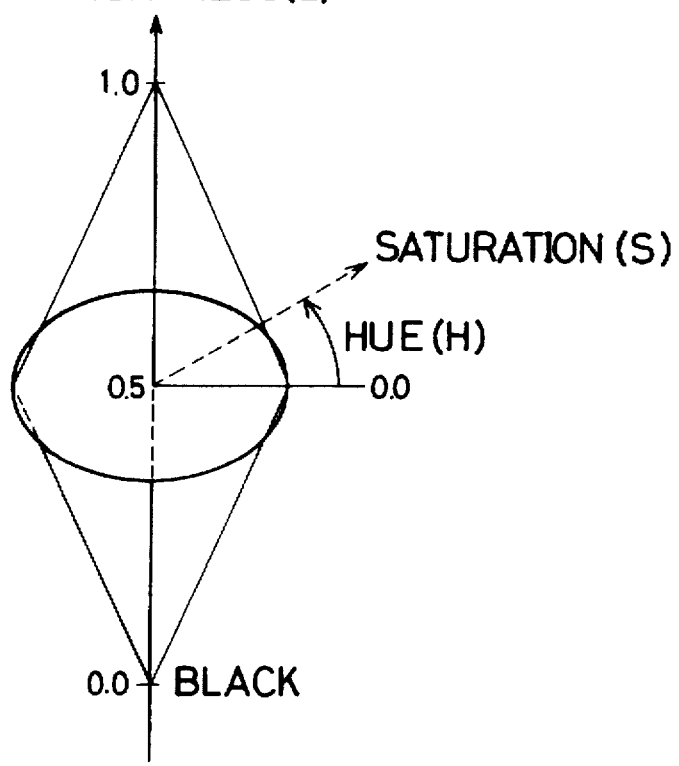
FIG. 5 is a diagram showing HLS color specification coordinate systems.
Figure 6:
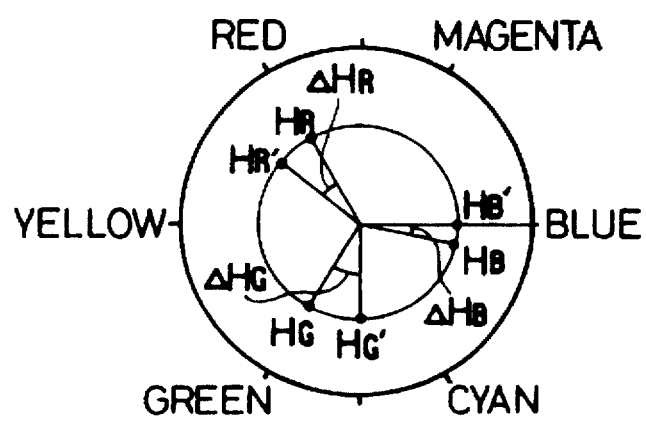
FIG. 6 is a diagram showing an H-S plane of the HLS color specification coordinate systems.

More specifically, if the pure red original image is assumed to be in a hue position HR, as shown in FIG. 6, in a H(hue)-S(saturation) plane of HLS color specification coordinate systems shown in FIG. 5, the image data read by the color scanner is considered to be equivalent to the image data obtained by reading an image of a color deviated from the hue $H_R$ by $\Delta H_R$ by the color scanner having the ideal color filter.

Since not only pure red, but also other colors are subject to color deviation as above, the read image data is equivalent to the image obtained by reading an original image of the respective colors which are, overall, deviated because of the spectral characteristics of the color filters of the color scanner.

Since a hue deviation $\Delta H$ differs depending on the color and the spectral characteristics of the respective color filters of the color scanner largely vary, it is generally very difficult to set the hue deviation $\Delta H$ of each color based on the spectral characteristics of the color filters.

However, according to the study conducted by the applicant, if any arbitrary color is set as a reference color and $\Delta Hr$ denotes a deviation of this reference color, deviation $\Delta H$ of the other color was confirmed to be expressed by $\Delta H \doteq K \cdot \Delta Hr$ (where K is a correction coefficient). For example, in the case that red is a reference color and $\Delta H_R$ denotes a red hue deviation, a blue hue deviation $\Delta H_B$ and a green hue deviation $\Delta H_G$ are expressed by $\Delta H_B \doteq -0.5 \cdot \Delta H_R$ (where the correction coefficient $K_B = -0.5$) and $\Delta H_G \doteq 1.5 \cdot \Delta H_R$ (where the correction coefficient $K_G = 1.5$), respectively.

Accordingly, if the correction coefficients K of the respective colors are obtained in advance, it is possible to detect the hue deviation $\Delta Hr$ of the reference color caused by the spectral characteristics of the color filters of the color scanner to be used and to set a hue deviation $\Delta H$ of an arbitrary color by multiplying the hue deviation $\Delta Hr$ by the correction coefficient K.

In this embodiment, the correction coefficients K of the respective colors which are empirically obtained beforehand are stored in the memory 110; the hue deviation $\Delta Hr$ of the predetermined reference color (e.g., red) is detected by reading the original image of the reference color; and the hue deviations $\Delta H$ of the respective colors of the image data read from the original image which deviations are obtained by multiplying the hue deviation $\Delta Hr$ by the correction coefficients K are set as correction data.

Figure 7:
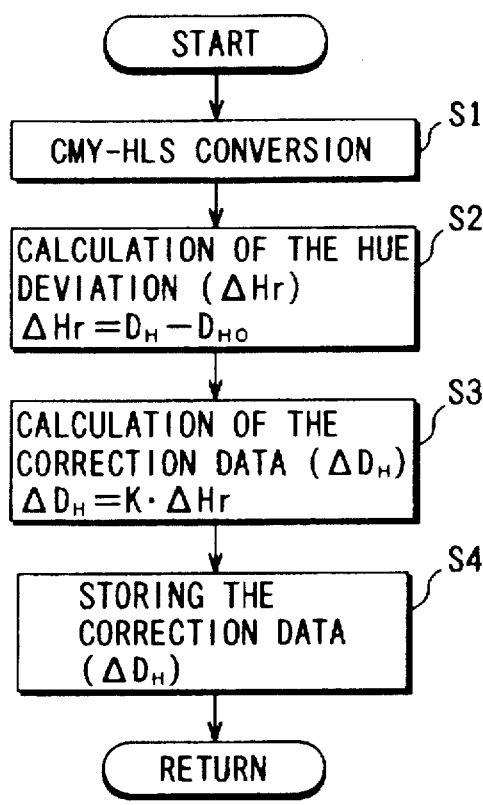
FIG. 7 is a flow chart showing a procedure of setting a correction data.

The correction data are set in accordance with a flow chart shown in FIG. 7.

When the color copier 1 is activated, a correction data setting mode is set using the operation switches 5. When the reading of the original image of the reference color is instructed, a correction data setting operation shown in FIG. 7 is performed using the read image data.

Specifically, the image data of C-, M-, Y-components obtained by reading the original image of the reference color by the scanner 2 are converted into H-, L-, S-image data by the following CMY-HLS conversion equations (Step S1):

[CMY-HLS Conversion Equations]
(1) Calculate

Max=max $(D_c, D_M, D_Y)$

Min=min $(D_c, D_M, D_Y)$ where $D_c, D_M, D_Y$ denote levels of cyan, magenta, and yellow signals.

(2) If Max=Min, the read image has an achromatic color.

Thus, the conversion is completed by setting H-components $D_H=0$, S-components $D_s=0$.

(3) Calculate c=(Max−$D_c$)/(Max−Min)

m=(Max−$D_M$)/(Max−Min)

y=(Max−$D_Y$)/(Max−Min)

(4) Calculate L-components $D_L$=(Max+Min)/2.0

(5) When $D_L \leq 0.5$, $D_s$=(Max−Min)/(Max+Min) When $D_L > 0.5$, $D_s$=(Max−Min)/(2.0−Max−Min)

(6) When $D_c$=Max, $D_H$=2+y−m When $D_M$=Max, $D_H$=4+c−y When $D_Y$=Max, $D_H$=6+m−c.

(7) $D_H$=60×$D_H$ (mod 360°)

where $D_H, D_L, D_s$ are conversion values of hue, lightness, and saturation and $0° \leq D_H \leq 360°$, $0 \leq D_L \leq 1.0$ and $0 \leq D_s \leq 1.0$.

Subsequently, the hue deviation Δ Hr of the reference color is calculated based on the hue data $D_H$ obtained by the CMY-HLS conversion and a predetermined hue data $D_{HO}$ of the reference color (Step S2). The correction data of the respective colors (hue deviations) Δ $D_H$ (=K·Δ Hr) are calculated by multiplying the calculated hue deviation Δ Hr by the correction coefficients of the respective colors stored in the memory 110 (Step S3). These calculation results are stored in the memory 110 in correspondence with the respective colors (Step S4).

Although the original image of the reference color is read in this embodiment, a reference color original image may be read and an image data of a desired reference color may be extracted from the read image.

Further, although the image data of C-, M-, Y-components are HLS-converted since the image data are input in the form of C-, M-, Y-components, the extraction of colors to be converted and the color conversion can be performed in a manner similar to the above even in the case that the image is input in the form of color components of three mutually independent primary colors (e.g. R-, G-, B-components).

In the case that the image is input in the form of R-, G-, B-components, the image data of these color components in the respective pixel positions are converted into the image data of H-, L-, S-color components by the following RGB-HLS conversion equations, instead of the CMY-HLS conversion equations.

[RGB-HLS Conversion Equations]
(1) Calculate

Max=max $(D_R, D_G, D_B)$

Min=min $(D_R, D_G, D_B)$ where $D_R, D_G, D_B$ denote levels of red, green, and blue signals.

(2) If Max=Min, the read image has an achromatic color.

Thus, the conversion is completed by setting H-components $D_H=0$, S-components $D_s=0$.

(3) Calculate r=(Max−$D_R$)/(Max−Min)

g=(Max−$D_G$)/(Max−Min)

b=(Max−$D_B$)/(Max−Min)

(4) Calculate L-component $D_L$=(Max+Min)/2.0

(5) When $D_L \leq 0.5$, $D_s$=(Max−Min)/(Max+Min) When $D_L > 0.5$, $D_s$=(Max−Min)/(2.0−Max−Min)

(6) When $D_R$=Max, $D_H$=2+b−g When $D_G$=Max, $D_H$=4+r−b When $D_B$=Max, $D_H$=6+g−r.

(7) $D_H$=60×$D_H$ (mod 360°)

where $D_H, D_L, D_s$ are conversion values of hue, lightness, and saturation and $0° \leq D_H \leq 360°$, $0 \leq D_L \leq 1.0$ and $0 \leq D_s \leq 1.0$.

Next, the color correction in the color correcting circuit 103 is described.

The color correction includes a first color correction for correcting the color (hue) deviations in the respective pixel positions using the correction data and a second color correction for correcting the color in accordance with predetermined masking equations after the correction of the color deviations.

The first color correction is performed to correct the color deviations which occurred during the image reading operation caused by the spectral characteristics of the color filters of the CCD 94. The second color correction is performed to correct the color deviations which occurred during the image formation caused by the spectral characteristics of the actually used color toners of C, M and Y.

Figure 8:
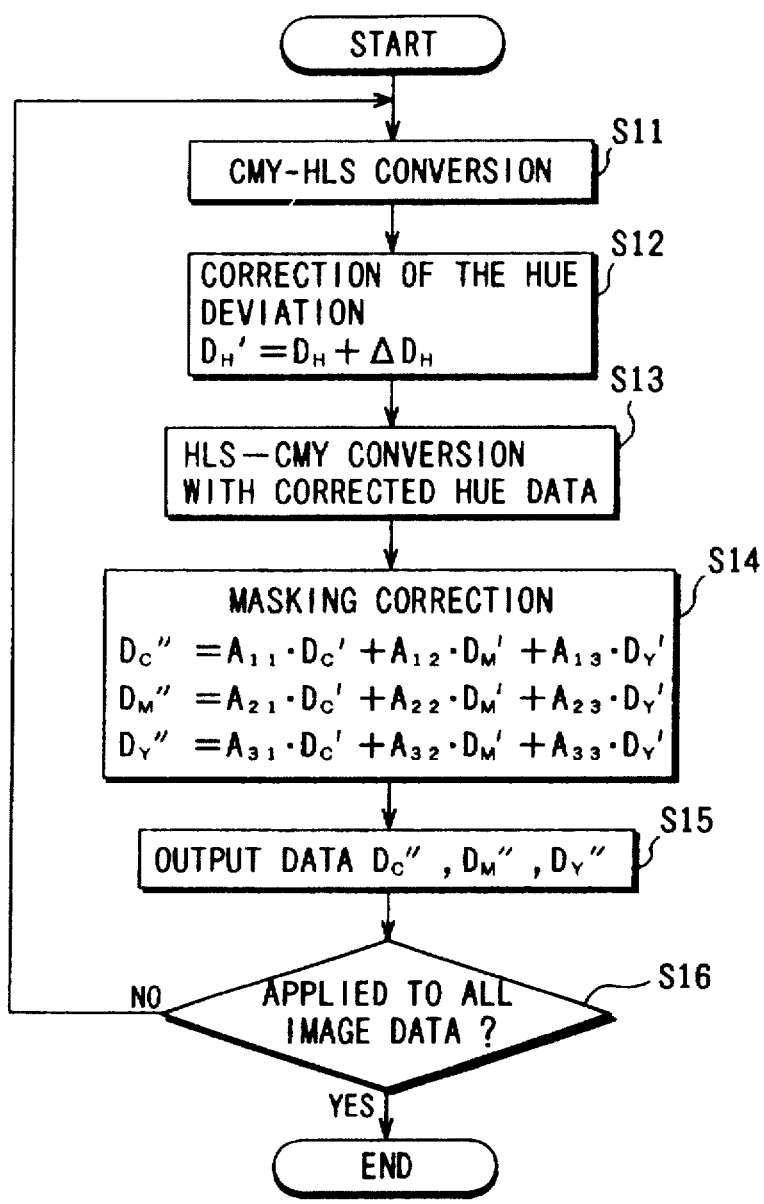
FIG. 8 is a flow chart showing a color correction.
Figure 9:
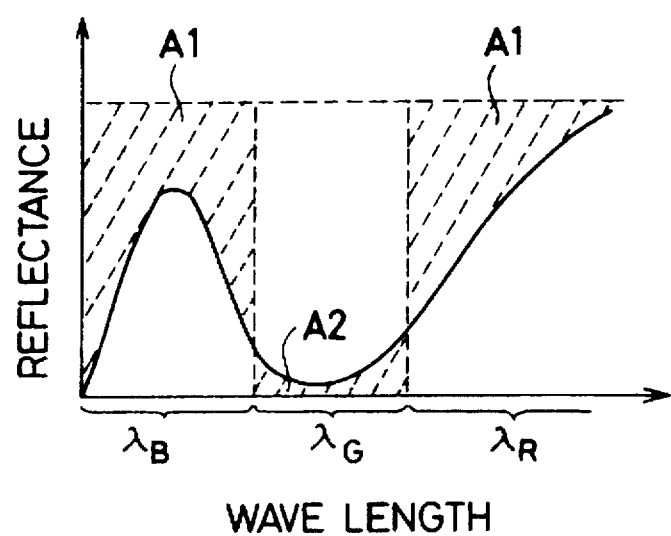
FIG. 9 is a graph showing an exemplary spectral characteristic of a magenta toner.

FIG. 8 is a flow chart showing an example of the color correction.

The image data of C-, M-, Y-components input in time series from the scanner 2 are output to the color correcting circuit 103 after being subjected to the specified image processing's in the input processing circuit 101 and the image discriminating circuit 102. In the circuit 103, the color correction is performed in accordance with the flow chart of FIG. 8.

First, the image data of C-, M-, Y-components are converted into the HLS image data (Step S11). Subsequently, the hue deviations are corrected by adding the correction data Δ $D_H$ stored in the memory 110 to the converted hue data DH (Step S12). Further, the HLS-converted image data are converted again into the image data of C-, M-, Y-components based on the hue data $D_H$ (=$D_H$+$D_H$) after the correction, a HLS-converted lightness data $D_L$ and saturation data $D_s$ in accordance with the following HLS-CMY conversion equations (Step S3):

[HLS-CMY Conversion Equations]
(1) When $D_L \leq 0.5$, P=$D_L$·(1.0+$D_s$) When $D_L > 0.5$, P=$D_L$+$D_s$+$D_L$·$D_s$ (2) Q=2$D_L$−$D_M$ (3) Calculate $D_c$: $D_c$=f(Q, P, $D_H$)

(4) Calculate $D_M$: $D_M$=f(Q, P, ($D_H$−120))

(5) Calculate $D_Y$: $D_Y$=f(Q, P, ($D_H$−240))

where the function f(Q, P, h) is defined as follows:

When $0 \leq h < 60$, f=Q+(P−Q)·h/60

When $60 \leq h < 180$, f=P

When $180 \leq h < 240$, f=Q+(P−Q)·(240−h)/60

When $240 \leq h < 360$, f=Q.

and $D_c, D_M, D_Y$ take a value in ranges: $0.0 \leq D_c, D_M, D_Y \leq 1.0$.

Subsequently, data $D_c, D_M, D_Y$ of the respective C-, M-, Y-components which are reconverted in Step S13 are converted into image data DC", DM", DY" in accordance with the masking equations (1) (Step S14). These image data DC", DM", DY" are output to the output color selecting circuit 104 (Step S15).

The color correction is performed for the image data obtained from all pixels (a loop of Steps S11 to S16), and is completed after the processing is applied to all image data (YES in Step S16).

As described above, before the masking correction, the input image data of C-, M-, Y-components are converted into the HLS image data of the respective color components, and the deviations of the hue data H of the respective colors caused by the spectral characteristic of the color filters of the scanner 2 are corrected using the correction data $\Delta D_H$. Accordingly, the color deviations caused by the spectral characteristics of the color filters of the scanner 2 are reduced, thereby improving the color reproducibility of the color image formed on the copy sheet.

Further, since the correction data $\Delta D_H$ are set by multiplying the hue deviation $\Delta Hr$ of the reference color by the predetermined correction coefficients K of the respective colors, even upon a change of the spectral characteristics of the scanner 2, the color deviations caused by the spectral characteristics after the change can be easily corrected.

In the foregoing embodiment, the correction data $\Delta D_H$ are set by multiplying the hue deviation $\Delta Hr$ of the reference color obtained by reading the original image of the reference color by the correction coefficients K of the respective colors. However, as an easier method, instead of the correction coefficients K, the correction data $\Delta D_H$ obtained in advance for the respective hues may be stored in the memory 110. With this method, there can be obviated need for an operation of setting the correction data $\Delta D_H$ of the respective hues after reading the original image of the reference color during the activation of the color copier and during a regular maintenance.

Further, although the invention is described taking the color copier as an example in the foregoing embodiment, it may be applied to an image processing system including a combination of a color scanner, a color printer and/or a computer.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A color correction device for applying a correction to image data, read from an original image by a color image reader means, separated into color components of three primary colors so as to correct color deviations caused by spectral characteristics of the color image reader means, comprising:

data conversion means for converting the color components of the three primary colors of the image data output from the color image reader means into image data comprising color components based on three attributes including hue data;

color deviation detection means for detecting a color deviation of a reference color, resulting from said spectral characteristics of the color image reader means, by comparing a hue data obtained by converting the image data of the reference color, read by the color image reader means and converted by the data conversion means, with a predetermined hue data of the reference color;

storage means for storing correction coefficients set in advance for the respective colors;

correction data setting means for setting correction data used to correct the color deviations of the respective colors by multiplying the detected color deviation of the reference color by the correction coefficients; and data correction means for correcting the hue data of the respective colors obtained by converting the image data, of the original image read by the color image reader means, using the data conversion means applying the correction data set by the correction data setting means.

2. A color correction device for applying a correction to image data, read from an original image by a color image reader means, separated into color components of three primary colors so as to correct color deviations caused by spectral characteristics of the color image reader means, comprising:

storage means for storing correction data used to correct the color deviations resulting from the spectral characteristics of the color image reader means for a plurality of predetermined hues;

data conversion means for converting the image data of the color components of the three primary colors of the image data output from the color image reader means into image data comprising color components based on three attributes including hue data; and data correction means for correcting the hue data of the respective colors obtained by converting the image data, of the original image read by the color image reader means, using the data conversion means applying the correction data for the hues stored in the storage means.

3. A color correction device according to claim 1, wherein the color components of the three primary colors are C (cyan), M (magenta) and Y (yellow).

4. A color correction device according to claim 2, wherein the color components of the three primary colors are C (cyan), M (magenta) and Y (yellow).

5. A color correction device according to claim 1, wherein the color components of the three primary colors are R (red), G (green) and B (blue).

6. A color correction device according to claim 2, wherein the color components of the three primary colors are R (red), G (green) and B (blue).

7. A color correction device according to claim 1, wherein the color components based on the three attributes are color components of a HLS color specification system.

8. A color correction device according to claim 2, wherein the color components based on the three attributes are color components of a HLS color specification system.

* * * * *